(12) United States Patent
Braddick

(10) Patent No.: US 8,100,199 B2
(45) Date of Patent: Jan. 24, 2012

(54) CONTINUOUS FLUID CIRCULATION VALVE FOR WELL DRILLING

(75) Inventor: Britt O. Braddick, Houston, TX (US)

(73) Assignee: TIW Corporation, Houston, TX (US)

( * ) Notice: Subject to any disclaimer, the term of this patent is extended or adjusted under 35 U.S.C. 154(b) by 297 days.

(21) Appl. No.: 12/475,654

(22) Filed: Jun. 1, 2009

(65) Prior Publication Data

US 2010/0300543 A1 Dec. 2, 2010

(51) Int. Cl.
*E21B 43/00* (2006.01)
(52) U.S. Cl. ............... 175/218; 251/315.01; 137/614.05
(58) Field of Classification Search ............... 137/1, 74, 137/75, 614, 614.05; 251/315.01, 315.11, 251/315.14; 175/218
See application file for complete search history.

(56) References Cited

U.S. PATENT DOCUMENTS

| | | | |
|---|---|---|---|
| 1,491,986 A | 4/1924 | Greene | |
| 3,036,590 A * | 5/1962 | Knox | 137/315.02 |
| 3,298,385 A | 1/1967 | Jackson et al. | |
| 4,478,244 A | 10/1984 | Garrett | |
| 4,627,598 A * | 12/1986 | Fremy | 251/149.2 |
| 4,871,019 A | 10/1989 | Haley et al. | |
| 6,119,772 A | 9/2000 | Pruet | |
| 6,283,151 B1 * | 9/2001 | Countryman et al. | 137/614.04 |
| 6,591,916 B1 | 7/2003 | Ayling | |
| 6,739,397 B2 | 5/2004 | Ayling | |
| 6,840,493 B2 | 1/2005 | York et al. | |
| 6,866,100 B2 | 3/2005 | Gudmestad et al. | |
| 7,028,586 B2 | 4/2006 | Robichaux | |
| 7,252,151 B2 | 8/2007 | Ayling | |
| 7,308,952 B2 * | 12/2007 | Strazhgorodskiy | 175/65 |
| 7,726,418 B2 | 6/2010 | Ayling | |
| 2007/0007483 A1 * | 1/2007 | Leblanc et al. | 251/315.14 |
| 2008/0093574 A1 * | 4/2008 | Ohta | 251/315.1 |
| 2008/0251259 A1 | 10/2008 | Braddick | |
| 2009/0242817 A1 * | 10/2009 | Strazhgorodskiy | 251/315.16 |

FOREIGN PATENT DOCUMENTS

WO WO98/16716 4/1998

OTHER PUBLICATIONS

A. Torsvoll, P. Horsrud, Statoil and R. Reimers. IADC/SPE 98947, Presentation at the IADC/SPE Drilling Conference held in Miami, Florida, Feb. 21-23, 2006 Continuous Circulation During Drilling Utilizing a Drillstring Integrated Valve—The Continious Circulation Valve.*

* cited by examiner

*Primary Examiner* — Shane Bomar
*Assistant Examiner* — Oleg V Merkoulov
(74) *Attorney, Agent, or Firm* — Streets & Steele

(57) ABSTRACT

Fluid circulation valve (10) is provided for use with a well drilling operation, so that a drill joint may be added to or removed from the drill string while continuously circulating fluid into the well. Valve housing (12, 18) has a central flow path therein, a housing side port (87), and upper and lower threaded connectors for engagement with the drill joint and the drill string, respectively. A rotatable ball (30) is positioned within the flow path in the valve housing and a port (87) in the ball is in fluid communication with the housing side port (15) when the ball is closed. A coupling (60) is provided for engaging the valve housing and sealing between an interior of the valve housing and the radially external flow line, which passes fluid into the well when a drill joint is being connecting to the upper end of the valve.

20 Claims, 2 Drawing Sheets

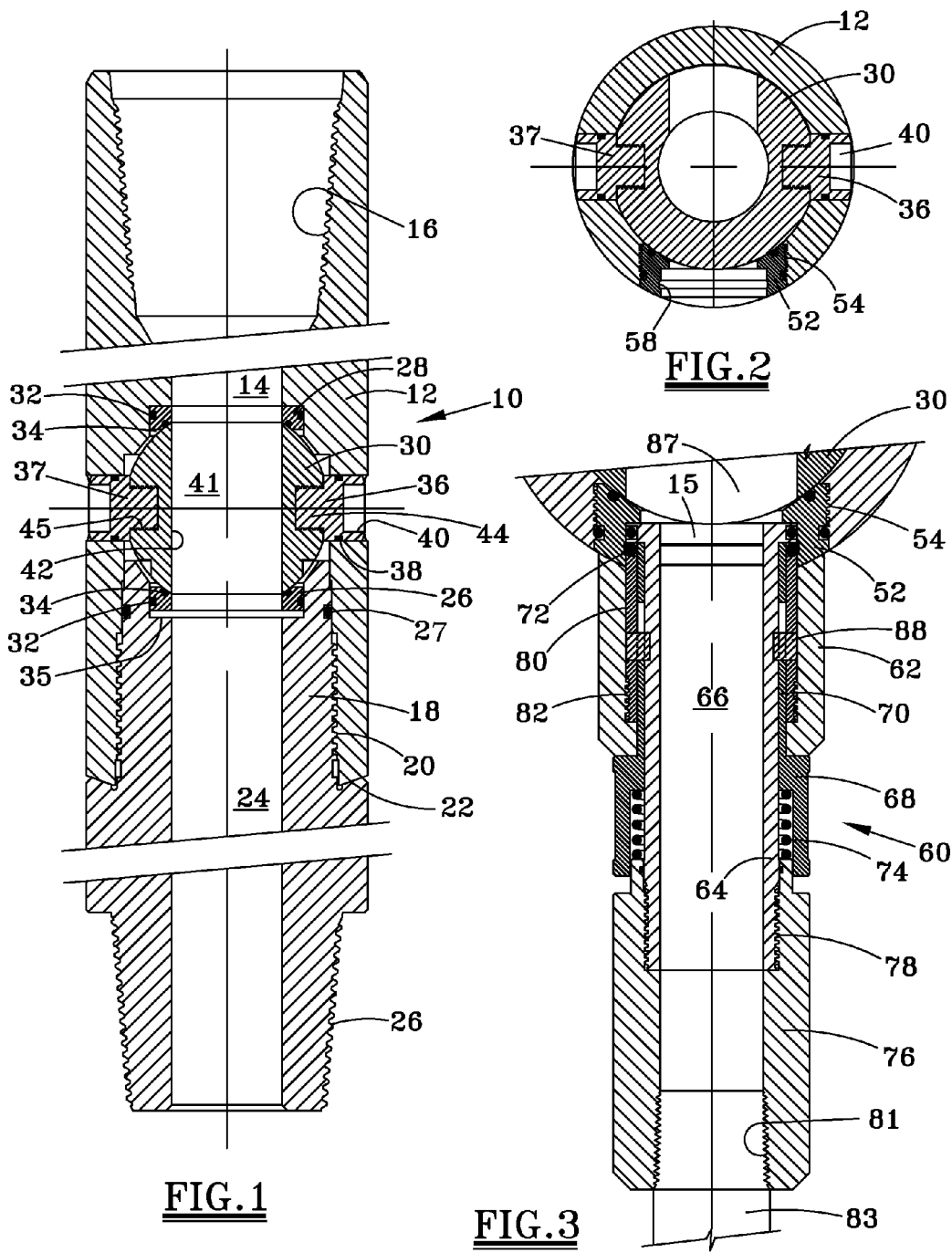

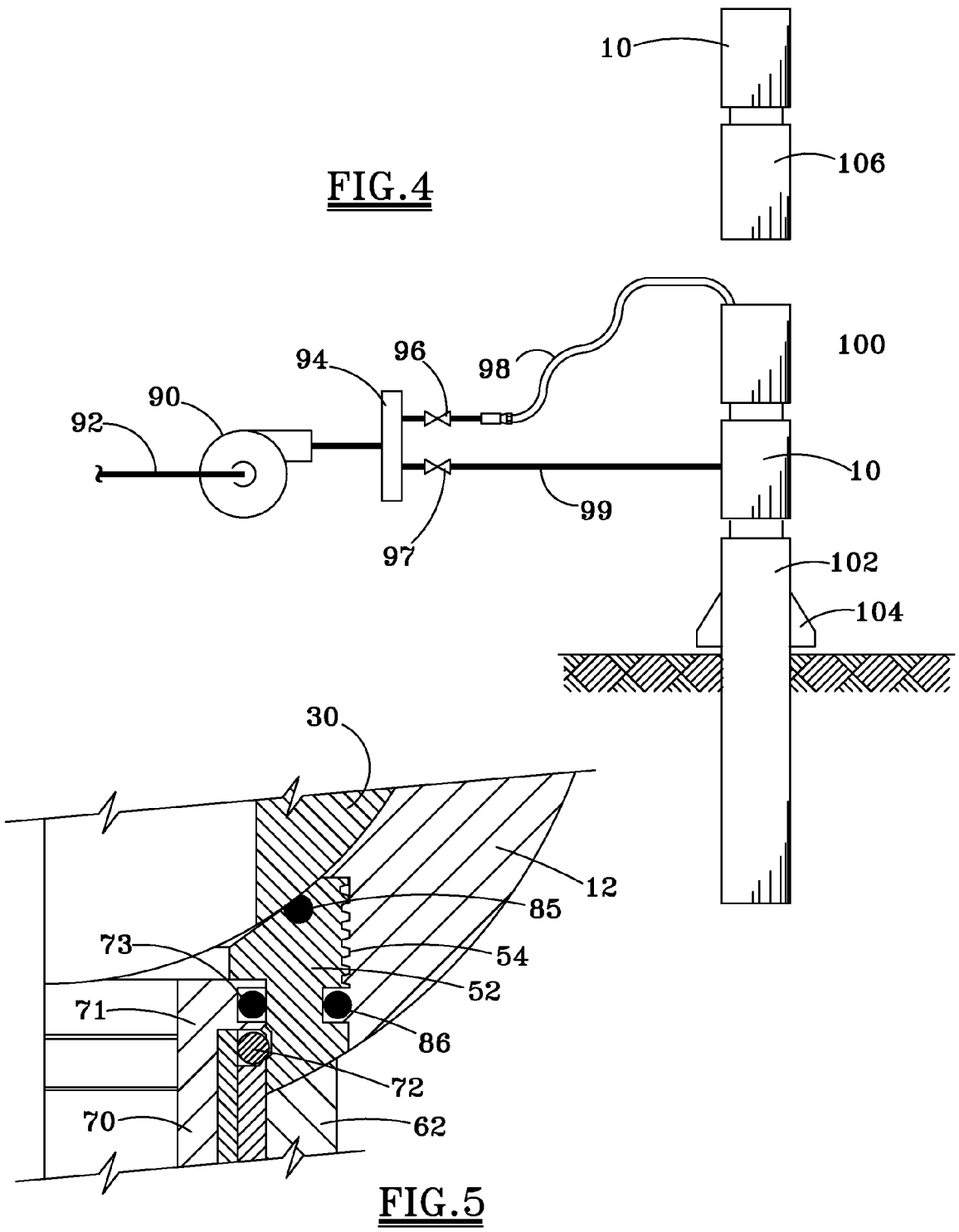

CONTINUOUS FLUID CIRCULATION VALVE FOR WELL DRILLING

FIELD OF THE INVENTION

The present invention relates to a method and equipment for drilling a well. More particularly, a circulation valve is provided for interconnection with a drill string joint, such that drilling fluids conventionally pass through the drill string joint, the valve, and the drill string in the well. When the drill string connection is being made up or broken apart, fluid is diverted through a side port in the valve, thereby maintaining substantially continuous fluid circulation.

BACKGROUND OF THE INVENTION

When drilling a hydrocarbon recovery well, the drill string is conventionally rotated to drive the drill bit. When a mud motor is used along the drill string to rotate the bit, the drill string is frequently rotated at a speed less than the bit to drill a straight section of a well. Drilling mud is thus circulated through the drill string and to the bit, and up the annulus between the drill string and the wellbore. As one or more joints are added to the string (running pipe), the drilling mud circulation process is briefly stopped to make up the threaded interconnection of the new joint to the drill string. Although the drill string is normally full of fluid, fluid pressure supplied by the mud pumps is lost when the pumps are shut off as the threaded connection is being made up. Restarting circulation can be difficult, and may lead to numerous drilling and well control problems. The process is reversed when pulling drill pipe from a well.

The prior art includes methods designed to allow a drill joint to be added to or removed from a drill string while circulation of mud continues. One prior art technique utilizes a coupler for substantially surrounding the threaded connection. Various rams, preventers, slips, and other closing devices substantially seal fluid within the coupler as the connection is made up. Devices of this type are disclosed in U.S. Pat. Nos. 6,119,772, 6,591,916, 6,739,397, 7,028,586, and 7,252,151. Publication WO98/16716 also discloses a continuous circulation drilling method. SPE 98947 by Torsvoll et al. discusses a continuous circulation valve for use while drilling. U.S. Pat. No. 4,478,244 discloses a mud saver valve which may be threaded to a drill string to reduce mud spills. U.S. application Ser. No. 11/786,495 discloses a safety valve with a ball rotatable engaging an actuator sleeve.

There are significant disadvantages to the above technique. First, the mechanisms for accomplishing continuous circulation by enclosing the connection involve expensive couplers, and numerous sealing devices are provided to minimize leakage of mud from these couplers. The device is also expensive, and at least in some applications slow down the makeup or breakout process, thereby contributing to higher drilling costs. Often techniques are complicated to use at a drilling rig, and/or slow down the time required to make up or break apart a threaded connection.

The disadvantages of the prior art are overcome by the present invention, in an improved technique for continuously circulating drilling mud in a drill string is hereinafter disclosed.

SUMMARY OF THE INVENTION

In one embodiment, a fluid circulation valve is provided for use with a well drilling operation, such that a drill joint may be added to or removed from a drill string which extends into a well. The fluid circulation valve includes a valve housing having a central flow path therein, a housing side port, an upper threaded connector for threaded engagement with the lower end of the drill joint, and a lower threaded connector for threaded engagement with an upper end of the drill string. A rotatable ball positioned within the flow path in the valve housing has a throughbore. The ball throughbore is in fluid communication with the housing central flow path when the ball is open, and the ball side port is in fluid communication with the housing side port when the ball is closed. The valve housing side port is in fluid communication with a line radially exterior of the valve housing, and typically extending to a mud pump. An attachment device is configured for engaging the valve housing, and a retractable sleeve is positioned within an attachment housing. A fluid circulation sleeve is positioned within the retractable sleeve, and a plurality of interference members secure the fluid circulation sleeve in place until the retractable sleeve is retracted. Fluid may be continuously circulated through the drill string even when adding or deleting a drill joint, since fluid may flow either through the ball throughbore or though the ball side port. The valve remains connected to the drill string as joints are added or removed and the string is run within or pulled from the well. The housing side port is closed when the ball throughbore is in fluid communication with the valve housing central flow path. The upper side of valve throughbore is closed when the ball is positioned to open the side port into the interior of the housing.

These and further features and advantages of the present invention will become apparent from the following detailed description, wherein reference is made to the figures in the accompanying drawings.

BRIEF DESCRIPTION OF THE DRAWINGS

FIG. 1 is a cross-sectional view of one embodiment of a fluid circulation valve.

FIG. 2 is a cross-sectional view through the valve shown in FIG. 1.

FIG. 3 is a cross-sectional view showing an attachment device supported on the valve body for supplying fluid to a side port in the valve body.

FIG. 4 is a block diagram of components for pulling a drill string from a well, including the fluid circulation valve as shown in FIGS. 1-3.

FIG. 5 is an enlarged view of the connection between the coupling and the valve body.

DETAILED DESCRIPTION OF PREFERRED EMBODIMENTS

FIG. 1 illustrates one embodiment of a fluid circulation valve according to the present invention. Circulation valve 10 includes a valve body, which as shown comprises an upper valve body 12 having upper threads 16 for threaded interconnection with the lower end of a pipe joint, and a lower valve body 18 having lower threads 26 for threaded connection with an upper end of a tubular string which extends into a well. The bodies 12 and 18 are joined by threads 20, with shoulder 22 acting between the bodies 12 and 18 to obtain a rigid connection, and to pass torque from above the valve to below the valve while positioned along a drill string, thereby allowing torque to be transferred to the bit to rotate the bit, or to actuate components along the drill string. A seal 27 may be provided for sealing between the housings 12 and 18. Those skilled in the art will appreciate that fluid may be pumped through the valve from the upper end of a pipe joint to the lower end of the pipe joint, then through the bodies 12 and 18, then through a tubular pipe string which extends into a well. Alternatively, fluid may be pumped downhole through the annulus and returned to the surface through the interior of the pipe string and through the valve 10.

FIG. 1 illustrates a ball 30 rotatably positioned within the valve housing, with the ball having a throughbore 41 defined by side walls 42, such that the throughbore 41 is in fluid communication with the bore 14 in the body 12 when the ball is in the open position, as shown in FIG. 1. Mud or other drilling fluid may thus be pumped from above the fluid circulation valve, through the fluid circulation valve, and into the drill string when the valve 10 is open. Note that the diameter of bore 41 in the ball 30 is substantially the same as bore 24 in body 18 (and the diameter of bore 14 in body 12), so that the valve does not restrict full bore access to the interior of the drill string.

The circulation valve preferably includes an upper valve seat 28 which has a seal 32 for sealing engagement with the housing 12, and another seal 34 for sealing engagement with the ball 30. The assembly further includes a lower ball seat 26 similarly having a seal 32 for sealing engagement with the housing 18, and another seal 34 for sealing with the ball 30. One or more biasing members, such as a wave spring or a Beliville spring 35, may be included to bias the lower seat 26 upward for sealing engagement with the ball. The Beliville spring or wave spring may thus exert a desired biasing force to press the seat into sealing engagement with the ball. This biasing force supplements the conventional upward force on the closed ball due to fluid pressure within the bore 24 below the ball. FIG. 1 also illustrates an operating stem or guide block 36 with seal 38 for sealing engagement with the housing 12, a noncylindrical external access pocket 40 for receiving a ball rotating tool, and an actuating member 44 for fitting within a receiving recess within the ball to rotate the ball when the operating stem or guide block 36 is rotated, as explained hereafter. In one embodiment, the actuating member 44 may be threaded at 45 to the ball, so that rotation of the guide block rotates the ball 30. FIG. 1 depicts a pair of identical guide blocks 36 and 37. The stem may be rotated in one direction from one side to open the valve, and is rotated in the opposite direction from the other side to close the valve.

FIG. 2 is a horizontal cross sectional view through the valve and the ball in FIG. 1, with the ball 30 in the open position. The operating stem 36 has a radially inward pocket 40 for inserting a key or other torque transmitting tool into the receiving pocket 40, so that the ball rotates in response to rotation of one of the operating stems 36 and 37. A torque wrench may be used for fitting in pocket 40 and rotating either or both operating stems. FIG. 2 also discloses an inlet ring 52 which is threaded at 54 into engagement with the housing 12, and is discussed below. Inlet ring 52 may be additionally sealed to the valve housing 12 at seal 86, as shown in FIG. 5. Another seal 85 on the inlet ring 52 is discussed subsequently.

FIG. 3 shows a suitable attachment device, such as coupling 60, for engaging an outer surface of the housing 12, and for temporarily sealing between the interior of valve 10 and a flow line 83 radially external of the valve, with line 83 typically being a flexible line extending to a mud pump or other source of pressurized fluid. As shown in FIG. 3, the port 87 in the ball is rotated 90° from the open position to the closed or bypass position wherein port 87 is in fluid communication with the side port 15 in the valve body, and also is in communication with the interior of coupling 60. Coupling 60 includes an outer housing 62, which may be brought into engagement with ring 52. The coupling includes an inner sleeve 64 having a fluid passageway 66 therein, and a retractable sleeve 70 having an operator portion 68. The retractable sleeve 70 is positioned radially about the inner sleeve 64, and an intermediate sleeve 80 is positioned between the retractable sleeve and the outer housing 62. The retractable sleeve 70 is normally maintained in the extended position, as shown in FIG. 3, by the coil spring 74. In this position, a plurality of circumferentially positioned ball members 72 are positioned within the groove 58 as shown in FIG. 2. Intermediate sleeve 80 is positioned between retractable sleeve 70 and the outer housing 62, and is threaded to the outer housing at 82. Ball members 72 are radially trapped between the radially inner surface of the groove 58 in the ring 52 and the outer surface of the retractable sleeve 70, and thereby connect the outer sleeve 62 and the intermediate sleeve 80 to the inner sleeve 64. When the retractable sleeve 70 is retracted (moved downward relative to the ball 30 as shown in FIG. 3), the ball members 72 are free to move radially inward and disengage the groove in ring 52, thereby allowing the entire coupling 60 to be removed from the valve housing. The inner sleeve 64 is shown threaded at 78 to coupling 76, which has threads 81 for threaded connection to the flexible flow line 83. The coupling 76 also acts as a retainer for the coil spring 74 to exert a biasing force on the retractable sleeve to normally hold the sleeve in the position as shown in FIG. 3.

The design as disclosed herein includes a pair of circumferentially opposing guide blocks or operating stems, each with a tool recess pocket. One operating stem may be used to rotate the ball from the open to the closed position, and the other operating stem used to rotate the ball from the closed to the open position. In another embodiment, only one stem may be provided for interconnection to the ball 30 and for rotating the ball between the open and closed positions. If desired, a flange on a similar operating stem may retain the single operating stem in position with respect to the valve housing, thereby maintaining the ball centered in spite of high pressure acting on the operating stem. Two radially opposing operating stems allow fluid pressure to act on both operating stems, so that opposing forces cancel in the center of the valve body.

It is a particular feature of the present invention that the attachment coupling as shown in FIG. 3 leaves no components attached to the valve body 12 which are exterior of the outer cylindrical surface of the valve body when the valve is run into a well. Those skilled in the art will appreciate that any components extending beyond the exterior cylindrical surface of the valve body 12 would likely become damaged and/or interfere with drill string running operations if such components extended beyond the exterior of the valve housing. As disclosed herein, the attachment coupling may be easily removed from the housing 12, with only the inlet sleeve 52 remaining secured to the valve body.

The inlet sleeve 52 provides a low cost technique for forming a replaceable inlet in the valve housing. Functionally, the inlet ring 52 is part of the valve housing, in that the groove 58 in the inlet ring receives a portion of the interference ball members for securing coupling 60 in place on the valve housing until the retractable sleeve 70 is retracted, thereby allowing the coupling 60 to be engaged with the valve body and disengaged from the valve body. This engagement will normally occur after the ball is rotated so that fluid flow goes from above to below the valve, as shown in FIG. 1. If desired, this movement of the ball 30 may be used to automatically terminate flow of fluid through the side port via the flexible line 83 and to the coupling 60. Once coupling 60 is disconnected from the valve body, the valve may continue downhole with the drill joint into the well. The retrieval of the string and the circulation valve associated with each joint, or with every selected joint, e.g., every third joint, may be accomplished in a manner now apparent to those skilled in the art.

FIG. 5 depicts in greater detail the inlet ring 52 sealed by o-ring 85 to the ball 30 and by o-ring 86 to the valve body 12. Upper end 71 of the inner sleeve 70 has an outwardly projecting flange with a seal 73 for sealing with a radially interior surface of the inlet sleeve 52 when the coupling is secured to the valve body. FIG. 5 also depicts one of the circumferentially arranged balls 72 residing partially in the pocket 58 as shown in FIG. 2, such that the coupling can only be released from the inlet sleeve 52 when the sleeve 70 is pulled away from the valve body to compress the spring 74 and allow the balls 52 to move radially inward, thereby releasing the coupling from the valve body.

Those skilled in the art should now appreciate that the valve as disclosed herein may be run in a well on drill pipe, with a valve 10 used for each stand of drill pipe, whether that be a single drill pipe joint or two or more drill pipe joints. In any event, a valve is added to each stand of drill pipe when run in a well, and is removed from each stand of drill pipe when pulled from a well. A fairly large number of valves may be required for many drilling operations.

FIG. 4 discloses a block diagram of a suitable system for continuously circulating fluid through the valve 10 when a drill string is run in a well. Pump 90 pressurizes fluid from supply line 92, which may be conventionally connected with the fluid flow out of the well, e.g., a "mud" pit for holding fluid and allowing particulates to settle. Pressurized fluid from the pump 90 may be passed through manifold 94, which distributes pressurized fluid through lines 98 and 99 to the continuous circulation valve 10. When valve 97 along the flow 99 is open, pressurized fluid may be supplied to the side port of the valve 10, as discussed above. When the ball within valve 10 is rotated to the open position and valve 96 is open, pressurized fluid may be supplied via line 98 to a kelly or top drive 100 placed on top of the valve 10, so that fluid will flow through the kelly or top drive 100, through the valve 10, and into the drill string 102, which is supported on slips 104 and extends into the well. When the ball is moving between the open and closed positions, fluid may be supplied simultaneously via the line 99 to the side port in the valve 10, and via the line 98 to the central flow port through the valve 10.

To add a new stand to the drill string, all fluid supplied to the valve 10 may be temporarily passed through the line 99, and valve 96 may be closed to stop fluid flow to the kelly or top drive 100. With the ball in valve 10 in the closed position and fluid supplied through its side port, the kelly or top drive 100 may be unthreaded from the top of valve 10, and another valve 10 placed on top of the next drill stand 106, and a lower end of stand 106 may be threaded to the upper end of closed valve 10 which is still being supplied with fluid from the line 99. Once this connection of stand 106 to lower valve 10 is made up, lower valve 10 is opened, valve 96 is opened, valve 97 may be closed, and the attachment coupling removed from the lower valve 10, so that fluid may thereafter continuously flow via line 98 to the repositioned kelly 100, through the newly added upper valve 10, through the stand 106, through the lower valve 10, and into the drill string 102. The drill pipe slips may be released, allowing the lower valve 10 and the drill pipe stand to be lowered with the string 102 into the well. Another valve 10 may be positioned at the upper end of stand 106, and the kelly then placed on top of the new valve 10. The kelly 100 may thus be repeatedly used with each drill stand, while a ball valve 10 is included for each drill stand. A "drill stand" may thus consist of one or more drill joints, and each stand will have its own circulating valve 10 when the stand is added to a drill string. Continuous circulation of fluid downhole may be important when running a tubular into the well to minimize the likelihood of "stick-slip" and to prevent overpressurizing the portion of the well while running the tubular into the well, thereby minimizing damage to the skin of the formation. Continuous circulation may also be important when pulling a tubular out of the well, since tubular pulling operations can be more reliably performed while circulating, thereby minimizing the likelihood of low and high pressure regions within the well. Continuous circulation valves may not be required for the entire drill string if continuous circulation is only needed for a portion of the drill string. Those skilled in the art will appreciate that the reverse process may be used to recover each of the valves 10 from the drill string when pulling the drill string from a well.

The term "ball" as used herein is intended in its broad sense to refer to a rotatable closing member in a valve, with at least a portion of the outer surface of the ball being similar in configuration to a portion of a sphere. While the ball as disclosed herein obviously need not be a sphere, the ball does rotate about a ball center.

The fluid circulation valve as disclosed herein may be used in well drilling operations wherein fluid passes through a drill joint, through the valve, and into the drill string while the valve is in the open position, and fluid passes from an external flow line, through the side port in the valve housing, downward through a lower end of the valve body, and into the drill string when the valve is closed. During the valve closed cycle, the drill joint may be fluidly connected with the top of the valve, and once this connection is complete, the valve may be opened so that the external flow line is blocked and fluid can be pumped into the well through the drill joint, which is now part of the drill string.

As used herein, the term "well drilling" refers to operations wherein a drill bit is positioned at the lower end of a drill string, and is rotated for drilling a portion of the well. As discussed above, well drilling operations may involve rotation of the entire drill string from the surface to rotate the bit, or may involve a slow or no rotation of the drill string at the surface, with high-speed rotation of the bit provided by the positive displacement motor positioned at the lower end of the drill string above the bit. In either event, the fluid circulation valve can be reliably used for continuously supplying fluid to the bit both when lowering a drill string in the well and when connecting or disconnecting a drill joint from the drill string.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A fluid circulation valve for use in well drilling with a drill stand and a drill string extending into the well, comprising:

a valve housing having a central flow path therein, an upper threaded connector for threaded engagement with a lower end of the drill joint, a lower threaded connector for threaded engagement with the upper end of the drill string, and a housing side port for selective fluid communication with a flow line radially exterior of the valve housing;

a ball rotatably positioned within the flow path and having a throughbore and a side port, the ball throughbore being in fluid communication with the housing central flow path and the housing side port closed when the ball is open, the valve housing sealing fluid in the central flow path from above the ball to below the ball;

an upper portion of the valve housing central flow path being closed and the housing side port and the ball side port are in fluid communication with a lower portion of the valve housing central flow path when the ball is closed; and an attachment coupling for selectively engaging a wall of the valve housing adjacent the housing side port, the attachment coupling including a retractable sleeve positioned within the coupling outer housing, a fluid circulation sleeve positioned within the retractable sleeve and adapted for sealed engagement with the valve housing, and a plurality of circumferentially spaced interference members acting between the valve housing and the retractable sleeve to secure the fluid circulation sleeve to the valve housing until the retractable sleeve is retracted.

2. A fluid circulation valve as defined in claim 1, further comprising:
a spring for biasing the retractable sleeve toward the valve housing.

3. A circulation valve as defined in claim 1, further comprising:
a flexible line coupling upstream from the fluid circulation sleeve for fluid engagement with the fluid circulation sleeve and with a flexible line.

4. A circulation valve as defined in claim 1, wherein the valve housing includes a metal inlet ring for engagement with the attachment coupling.

5. A circulation valve as defined in claim 4, further comprising:
a seal ring for sealing between the inlet ring and the fluid circulation sleeve.

6. A circulation valve as defined in claim 1, further comprising:
an upper valve seat for sealing between the ball and the housing; and
a lower valve seat for sealing between the ball and the housing.

7. A circulation valve as defined in claim 1, further comprising:
a rotatable operating stem positioned within the valve body for engaging the ball and rotating the ball between the open and closed positions.

8. A circulation valve as defined in claim 7, wherein the operating stem comprises a pair of circumferentially opposing operating stems.

9. A circulation valve as defined in claim 1, wherein the interference members comprise a plurality of ball members.

10. A fluid circulation valve for use in well drilling with a drill stand and a drill string extending into the well, comprising:
a valve housing having a central flow path therein, an upper threaded connector for threaded engagement with a lower end of the drill joint, a lower threaded connector for threaded engagement with the upper end of the drill string, and a housing side port for selective fluid communication with a flow line radially exterior of the valve housing;
a ball rotatably positioned within the flow path and having a throughbore, the ball throughbore being in fluid communication with the housing central flow path when the ball is open, the valve housing sealing fluid in the central flow path from above the ball to below the ball;

an upper portion of the valve housing central flow path being closed and the housing side port and the ball side port are in fluid communication with a lower portion of the valve housing central flow path when the ball is closed; and a rotatable operating stem positioned within the valve body for engaging the ball and rotating the ball to move between open and closed positions; and an attachment coupling for selectively engaging a wall of the valve housing adjacent the housing side port, the attachment coupling including a retractable sleeve positioned within the coupling outer housing, a fluid circulation sleeve positioned within the retractable sleeve and adapted for sealed engagement with the valve housing, a spring for biasing the retractable sleeve toward the valve housing, and a plurality of circumferentially spaced interference members acting between the valve housing and the retractable sleeve to secure the fluid circulation sleeve to the valve housing until the retractable sleeve is retracted.

11. A circulation valve as defined in claim 10, further comprising:
a flexible line coupling upstream from the fluid circulation sleeve for fluid engagement with the fluid circulation sleeve and with a flexible line.

12. A circulation valve as defined in claim 11, wherein the valve housing includes an inlet ring for engagement with the attachment coupling; and
a seal ring for sealing between the inlet ring and the fluid circulation sleeve.

13. A circulation valve as defined in claim 11, further comprising:
an upper valve seat for sealing between the ball and the housing; and
a lower valve seat for sealing between the ball and the housing.

14. A circulation valve as defined in claim 10, wherein the operating stem comprises a pair of circumferentially opposing operating stems.

15. A circulation valve as defined in claim 11, wherein the interference members comprise a plurality of ball members.

16. A method of circulating fluid through a drill string extending into the well, comprising:
providing a valve housing having a central flow path therein and a housing side port for selective fluid communication with a flow line radially exterior of the valve housing;
connecting an upper threaded connector on the valve housing with a lower end of a drill joint;
connecting a lower threaded connector on the valve housing with the upper end of the drill string;
rotatably positioning a ball having a throughbore within the flow path, the ball throughbore being in fluid communication with the housing central flow path and the housing side port closed when the ball is open, the valve housing sealing fluid in the central flow path from above the ball to below the ball;
closing an upper portion of the valve housing central flow path, the housing side port and the ball side port being in fluid communication with a lower portion of the valve housing central flow path when the ball is closed;
selectively attaching a coupling to a wall of the valve housing adjacent the housing side port, the coupling including a retractable sleeve positioned within the coupling outer housing, a fluid circulation sleeve positioned within the retractable sleeve and adapted for sealed engagement with the valve housing, and a plurality of circumferentially spaced interference members acting between the valve housing and the retractable sleeve to secure the fluid circulation sleeve to the valve housing; and retracting the retractable sleeve to engage and disengage the coupling from the valve housing.

17. A method as defined in claim 16, further comprising:
biasing the retractable sleeve toward the valve housing with a biasing member.

18. A method as defined in claim 16, further comprising:
providing a seal ring for sealing between the valve housing and the fluid circulation sleeve.

19. A method as defined in claim 16, further comprising:
sealing between the ball and the housing with an upper valve seat; and
sealing between the ball and the housing with a lower valve seat.

20. A method as defined in claim 16, further comprising:
providing a rotatable operating stem within the valve body for engaging the ball and rotating the ball to move between the open and closed positions.

* * * * *